United States Patent [19]

Abbas et al.

[11] Patent Number: 4,971,828

[45] Date of Patent: Nov. 20, 1990

[54] BEVERAGE CLOUDING AGENT

[75] Inventors: Ibrahim R. Abbas, Highland, Ind.; Roxane M. Bishop, Crete; William J. Mackey, Lynwood, both of Ill.; Sakharam K. Patil, Schererville; Jerry E. Wilson, Gary, both of Ind.

[73] Assignee: American Maize-Products Company, Stamford, Conn.

[21] Appl. No.: 379,499

[22] Filed: Jul. 13, 1989

[51] Int. Cl.$^5$ ............................................. H23L 1/09
[52] U.S. Cl. .................................... 426/661; 426/590; 426/658; 426/456
[58] Field of Search ............... 426/590, 599, 661, 578, 426/456

[56] References Cited

U.S. PATENT DOCUMENTS

| | | | |
|---|---|---|---|
| 3,736,149 | 5/1973 | Knapp | 426/590 |
| 3,959,510 | 5/1976 | Felton et al. | 426/590 |
| 3,974,033 | 8/1976 | Harjes et al. | 426/661 |
| 4,187,326 | 2/1980 | Serafino et al. | 426/590 |
| 4,279,940 | 7/1981 | Wurzburg et al. | 426/661 |
| 4,349,577 | 9/1982 | Tessler | 426/661 |
| 4,529,613 | 7/1985 | Mezzino et al. | 426/590 |
| 4,705,691 | 11/1987 | Kupper et al. | 426/590 |

*Primary Examiner*—Jeanette Hunter
*Attorney, Agent, or Firm*—Lucas & Just

[57] ABSTRACT

A method for making a beverage clouding agent entails acid hydrolysis of a starch without the use of agitation during hydrolysis followed by a step of lowering the temperature of the hydrolysate to between 45° C. to 60° C. coupled with increasing the solids level of the slurry containing the hydrolysate to between 30° to 45° Be. If the slurry containing the hydrolysate is spray dried to obtain the hydrolysate, then the slurry should be preheated prior to spray drying to not more than 90° C. The clouding agent produced is a starch hydrolysate which in an about 0.1% aqueous solution has a spectrophotometric reading below 70%T when measured at 25° C. through a 1 cm cell at 600 nm.

8 Claims, 1 Drawing Sheet

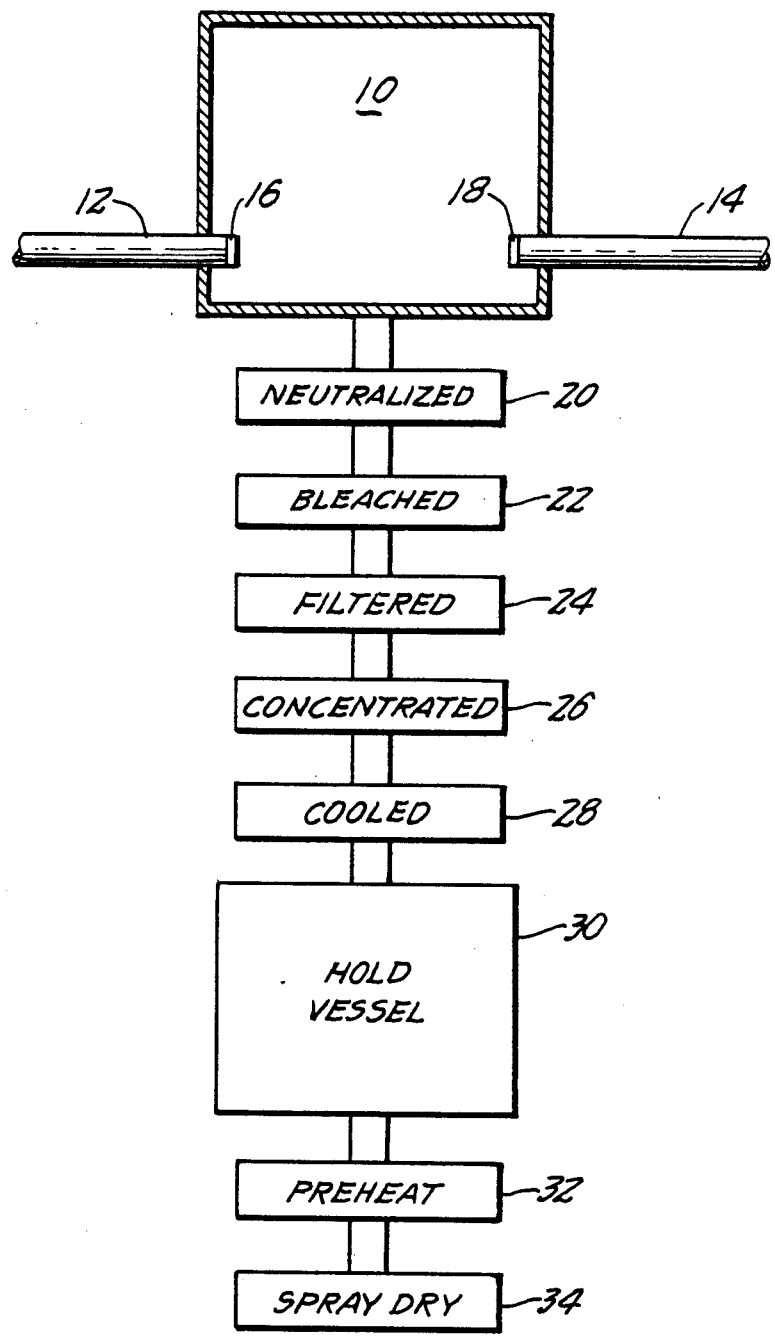

BEVERAGE CLOUDING AGENT

This invention relates to a clouding agent used in food and, more particularly, to a method for making a clouding agent from starch for use in a beverage.

Clouding agents are used in food especially beverages to impart turbidity or haze. Conventional clouding agents include stabilized, partially hydrogenated vegetable oil and titanium dioxide.

Typically, a clouding agent is added to a beverage or an instant beverage mix when it is being formulated by the manufacturer. Ideally, the clouding agent imparts little or no taste to the beverage and provides a high degree of haze or turbidity to the beverage at low solids concentrations. Additionally, the clouding agent must be at least partially soluble or dispersible in the beverage and remain dispersed or suspended in the beverage for some period of time without settling out of the liquid. Also, a clouding agent should be easily redispersed in the liquid upon shaking or stirring of the beverage.

A method has now been discovered for making a clouding agent which disperses easily when added to water, imparts a high level of turbidity at low solids concentrations, and remains in solution for some period of time. The clouding agent made by the present invention may be used with a suspending aid such as a gum to extend its stability in solution. The clouding agent produced by the method of the present invention is bland in taste and imparts little or no flavor to beverages.

The clouding agent made by the present invention can be used to impart haze or turbidity to prepared beverages and dry beverage mixes. Conventional dry beverage mixes include instant lemonade mixes, milkshake mixes, orange drink mixes, instant puddings and the like.

The method of the present invention comprising treating an aqueous slurry of starch granules with acid at a temperature greater than about 110° C. without agitation to convert said starch to a starch hydrolysate having a dextrose equivalent between about 5 to about 20; and in a second subsequent step holding the slurry at a temperature below about 60° C. for a period of at least about 4 hours to produce a clouding agent which in an about 0.1% solids aqueous solution at 25° C. in a 1 cm cell at 600 nm has a transmittancy of less than about 70% when measured spectrophotometrically. In addition, more haziness or turbidity is obtained by increasing the concentration of clouding agent in solution.

Preferably, the holding step includes adjusting the solids level of the slurry to between about 30° to about 45°Be during the holding period.

If the slurry containing the starch hydrolysate is dried, such as by spray drying, then it is critical that the slurry be preheated to not more than about 90° C. prior to spray drying. The dried clouding agent preferably has a moisture content below about 12% and more preferably about 4% and below.

The dried starch hydrolysate produced by this process when added to water produces an aqueous solution having an initial transmittancy below about 70%T when measured spectrophotometrically at 600 nm in a 1 cm cell at 25° C., at a solids concentration of about 0.1%. Percent transmittance is measured in a conventional manner using a Bausch and Lomb Spectronic 21.

A description of the preferred embodiment of the present invention follows.

Treating an aqueous slurry of starch with an acid is accomplished by first making up a slurry of water and starch granules at a solids level between about 10° to about 30° Baume (Be) and more preferably about 15° to about 25° Be. Good results have been obtained at about 19° Be.

The term starch means a starch having an amylose content between about 10% to about 40%. Suitable sources of starches include corn, wheat, tapioca, potato and sago. Good results have been obtained with corn starch having an amylose content between about 20% to about 40%. Conventionally, such corn starch is referred to as common corn starch.

Acid is added to the slurry of starch to obtain a pH less than about 3 and preferably between about 1.5 to about 2.5. Suitable acids include hydrochloric and sulfuric. Good results have been obtained with hydrochloric at a pH of about 2.

The acidified starch slurry is then subjected to a rapid heating process whereby the starch is raised virtually instantaneously to above about 110° C. Normally, such a rapid rise in temperature disrupts the physical structure of the starch granule and causes some hydrolysis of the starch polymer. Such a rapid rise in heat is conducted conventionally in a "jet cooker" or "jet heater". In essence, a stream of acidified starch slurry and pressurized steam are introduced into a container. Preferably, the steam has a pressure of about 60 psi. The inlet streams of both the slurry and pressurized steam are in close proximity to each other such that the temperature of the slurry immediately rises to above about 110° C.

In conventional acid hydrolysis, the heated slurry is then subjected to agitation to get good dispersion of the acid and uniform conversion of the starch polymer to a hydrolysate. It has been discovered that in order to make the clouding agent of the present invention, no agitation is employed at this point in the hydrolysis reaction. The absence of agitation at this point and throughout the conversion of the starch to the starch hydrolysate helps to prevent a uniform conversion of the starch to the hydrolysate. Such non-uniform conversion means that the hydrolysate contains some partially disrupted starch granules. It is essential that non-uniform conversion of the starch takes place in the present invention. The clouding agent made by the present invention has partially disrupted starch granules therein. Conventional starch hydrolysate products made by acid hydrolysis in a DE range of about 5 to about 20 have no partially disrupted starch granules and the conversion of the starch granule to the hydrolysate is uniform.

During conversion of the starch to the hydrolysate, the temperature of the slurry is maintained above about 110° C. and preferably between 110° C. to 150° C. More preferably, between about 120° C. to about 140° C. Preferably, the slurry is maintained at an elevated pressure, about 60 psi. The temperature is preferably maintained by insulating the reaction vessel without the need for additional heat. The pressure is maintained in a conventional manner such as by using a closed reaction vessel.

The conversion of the starch to the starch hydrolysate can be conducted batchwise or in a continuous flow converter. Good results have been obtained in a continuous flow converter.

The hydrolysis reaction is allowed to proceed until the desired dextrose equivalent (DE) is reached, about 5 to about 20, and more preferably about 10 to about 20.

Good results have been obtained at a DE of about 16 to about 18.

Dextrose equivalent (DE) is a conventional term used in the starch industry to identify a starch hydrolysate. Dextrose equivalent (DE) is an indication of the total reducing value of the starch hydrolysate calculated as dextrose and expressed as a percentage of total dry substance. The DE values as used in this specification and claims are determined by a Lane and Eynon procedure as outlined in the Standard Analytical Methods Handbook of the member companies of The Corn Refiners Association, 6th Edition, E-26.

To terminate the acid hydrolysis reaction, the slurry is neutralized and allowed to come to atmospheric pressure. Preferably, the pH of the slurry is raised to between about 4 to about 7. Good results have been obtained by raising the slurry to a pH of about 4.5 to about 5.5. Suitable neutralizing agents are sodium carbonate (soda ash), sodium hydroxide and calcium hydroxide. Enough neutralizing agent is used to raise the pH to the desired level. Preferably, the slurry is neutralized after it has come to atmospheric pressure.

Next, the neutralized slurry is filtered and bleached in a conventional manner.

After filtering and bleaching, the extended hold step at reduced temperature is performed. Preferably, the slurry is concentrated to a solids level between about 30° to about 45°Be. Preferably, the solids level of the concentrated slurry is about 30° to about 40°Be. After concentrating the slurry, the slurry is cooled to a temperature below about 60° C. and preferably between about 60° C. to about 45° C. Even more preferred, the slurry is held at about 55° C.

This cooled slurry is held at a low temperature for a period of at least about 4 hours and preferably for a period between about 4 hours to about 48 hours. More preferred the slurry is held at a low temperature for a period of time between about 4 to about 12 hours. It is critical to the present invention that the slurry be held at a low temperature for a period of time.

Finally, the slurry is preferably dried to a powder. Alternatively, the slurry itself can be added to a beverage or mixed with other components and then if needed, dried with the other components.

In the preferred mode of the present invention, the slurry is dried with a spray drier to a white powder. Other drying techniques can be used such as a drum drier or a belt drier.

Conventional spray drying of slurry is done in a two step operation, first the slurry is preheated, then the slurry is spray dried. In conventional operations, the preheated slurry is typically raised to a temperature of about 95° C. When spray drying the starch hydrolysate of the present invention, it is critical that the slurry not be preheated above about 90° C. and preferably between about 75° C. to about 90° C.

Preferably, the moisture level of the starch hydrolysate is dropped below about 12% in the drying step and more preferably below about 6%.

These and other aspects of the present invention may be more fully understood by reference to the following example.

Common corn starch granules having an apparent amylose content of about 28% is mixed with water to form a slurry having a solids concentration of 19°Be. To this slurry hydrochloric acid is added to form a pH of 2.0. Then the slurry is pumped into vessel 10 through hose 12. Steam at 60 psi and at 150° C. is simultaneously pumped into vessel 10 through hose 14. Nozzle 16 through which the acidified starch slurry enters vessel 10 is in close proximity to nozzle 18 through which the steam enters vessel 10.

Vessel 10 is not equipped with an impeller and is insulated to maintain the temperature of the heated, acidified slurry. The slurry is held until it reaches a DE of 16–18. The slurry is then pumped out of vessel 10 and neutralized 20 with sodium carbonate to a pH of 7. The neutralized slurry is bleached 22, filtered 24 and concentrated 26 to a solids concentration of 39°Be. The concentrated slurry is then cooled 28 to a temperature of ° 55° C. and pumped into vessel 30. The slurry is held in vessel 30 for 8,hours.

To spray dry the slurry, it is pumped from vessel 30 to preheater 32 which preheats the slurry prior to spray drying to 80° C. The preheated slurry is then fed to a spray drier 34 which produces a powdered starch hydrolysate having a moisture of 4%.

It will be understood that it is intended to cover all changes and modifications of the preferred embodiment of the invention herein chosen for the purpose of illustration which do not constitute departure from the spirit and scope of the invention.

What is claimed is:

1. A method for preparing a clouding agent comprising:
    treating an aqueous slurry of starch granules with acid at temperature greater than about 110° C., without agitation, to convert said starch to a starch hydrolysate having a dextrose equivalent between about 5 to about 20, wherein said starch is selected from the group consisting of corn, wheat, tapioca, potato, and sago, and wherein said starch has an amylose content of between about 10% to about 40%; and in a second subsequent step
    holding the slurry at a temperature below about 60° C. for a period of at least about 4 hours to produce a clouding agent which in an about 0.1% solids aqueous solution at 25° C. in a 1 cm cell at 600 nm has a transmittance of less than about 70% when measured spectrophotometrically.

2. The method of claim 1 wherein the holding step comprises adjusting the solids level of the slurry to between about 30° to about 45°Be during the holding period.

3. The method of claim 1 wherein the starch is corn starch having an amylose content between about 20% and about 40%.

4. The method of claim 1 further comprising the step of drying the slurry to produce a starch hydrolysate having a moisture content below about 12%.

5. The method of claim 4 wherein the drying step is conducted by spray drying the slurry and said slurry is preheated to not more than about 90° C. prior to spray drying.

6. A method for making a clouding agent comprising the consecutive steps of:
    (a) treating an aqueous slurry of corn starch having an amylose content between about 10% to about 40%, at a solids level of between about 15° to about 25°Be with an acid to obtain an acid aqueous slurry having a pH between about 1.5 to about 2.5;
    (b) holding said acid slurry at a temperature between about 110° C. to about 150° C. in the absence of agitation to obtain a slurry comprising a starch hydrolysate having a dextrose equivalent between about 10 to about 20;

(c) neutralizing said acid slurry with neutralizing agent to obtain a neutralized slurry having a pH between about 4 to about 7;

(d) adjusting said neutralized slurry to a solids level of between about 30° to about 40°Be and a temperature of between about 45° C. to about 60° C.; and (e) maintaining said neutralized slurry at the temperature between about 45° C. to about 60° C. for a period of between about 4 hours to about 48 hours to obtain a clouding agent having a spectrophotometric reading at 600 nm, of less than about 70%T, in an about 0.1% aqueous solution, at 25° C. in a 1 cm cell.

7. The method of claim 6 further comprising the step of drying the slurry to a moisture content of below about 12%.

8. The method of claim 7 wherein the drying step is conducted using a spray drier and wherein prior to spray drying the slurry is preheated to between about 75° C. to about 90° C. prior to spray drying.

* * * * *